(12) United States Patent
Okada

(10) Patent No.: US 7,877,835 B2
(45) Date of Patent: Feb. 1, 2011

(54) METHOD AND APPARATUS FOR CLEANING MASTER DISK

(75) Inventor: Shinichiro Okada, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 279 days.

(21) Appl. No.: 12/173,572

(22) Filed: Jul. 15, 2008

(65) Prior Publication Data

US 2009/0020143 A1   Jan. 22, 2009

(30) Foreign Application Priority Data

Jul. 17, 2007 (JP) .............................. 2007-185871
Oct. 16, 2007 (JP) .............................. 2007-269016

(51) Int. Cl.
*B08B 1/00* (2006.01)

(52) U.S. Cl. ................... 15/102; 15/97.1; 15/3

(58) Field of Classification Search ........................ 15/3, 15/97.1, 102
See application file for complete search history.

(56) References Cited

U.S. PATENT DOCUMENTS

2001/0054210 A1*  12/2001  Matsuno et al. ............... 15/102

FOREIGN PATENT DOCUMENTS

| JP | 48-035771 A | 5/1973 |
|---|---|---|
| JP | 2001-176065 A | 6/2001 |
| JP | 3346660 B2 | 9/2002 |
| JP | 2005-169302 A | 6/2005 |

OTHER PUBLICATIONS

Notice of Reasons for Rejection, dated Nov. 16, 2010, issued in corresponding JP Application No. 2007-269016, 5 pages in English and Japanese.

* cited by examiner

*Primary Examiner*—Michael Barr
*Assistant Examiner*—Saeed T Chaudhry
(74) *Attorney, Agent, or Firm*—Sughrue Mion, PLLC

(57) ABSTRACT

In a method of cleaning a master disk according to the present invention, a self-adhesive surface sticking/peeling operation is performed on dust on the master disk by reciprocatingly oscillating the self-adhesive member while applying external forces in a plurality of directions. Dust on the master disk can be effectively removed by moving the self-adhesive member in this way and by using the adhesion of the self-adhesive member. Since the cleaning method according to the present invention is a removal method using a physical force, it has both the effect of removing organic materials and the effect of removing inorganic materials. Further, according to the present invention, the master disk to be cleaned can be cleaned in a state of being mounted on a disk holding member such as a holder. Therefore an apparatus of a comparatively simple construction can be applied in on-line form according to the cleaning method.

10 Claims, 16 Drawing Sheets

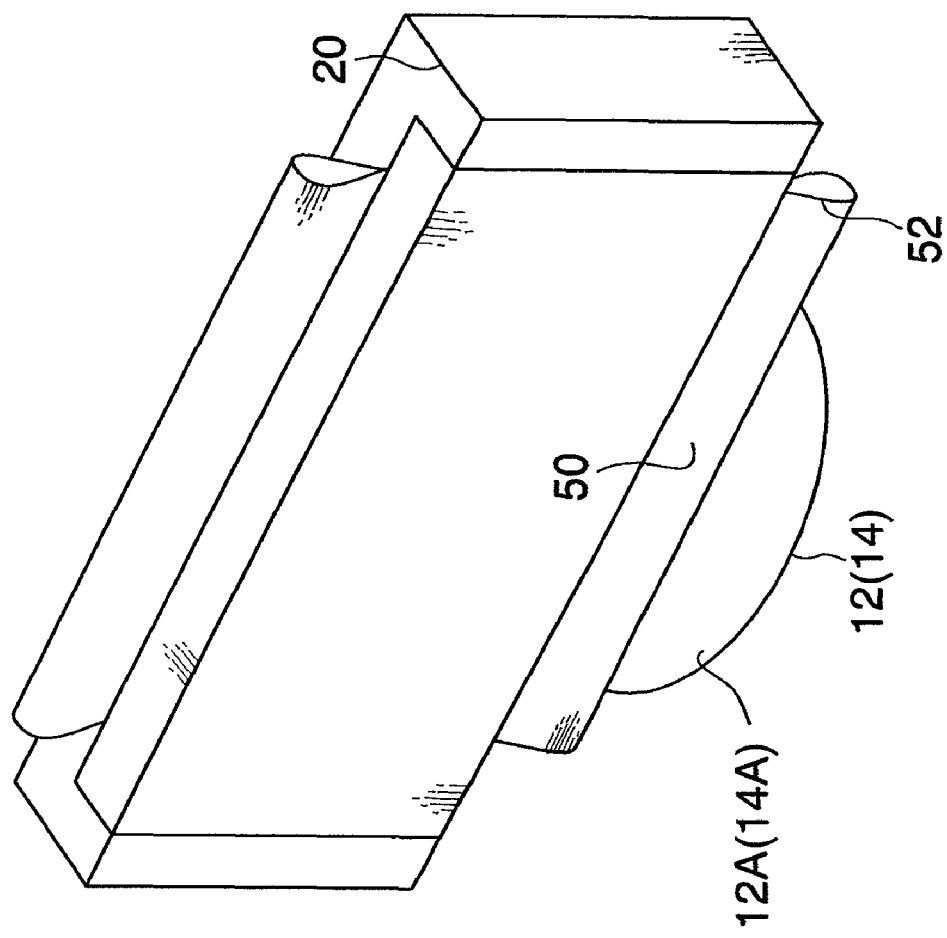

METHOD AND APPARATUS FOR CLEANING MASTER DISK

BACKGROUND OF THE INVENTION

1. Field of the Invention

The present invention relates to a method and apparatus for cleaning a master disk and, more particularly, to a cleaning technique suitable for removing dust attached to a master disk for transfer of magnetic information such as format information to a magnetic recording medium used in a hard disk unit or the like or a master disk used for nanoimprinting.

2. Description of the Related Art

In recent years, it has been a common practice to write format information and address information to a magnetic disk (hard disk) for use in rapidly-widespread hard disk drives before the magnetic disk is incorporated in a drive after being supplied from a magnetic disk maker to a drive maker. This writing may be performed with a magnetic head. However, a method of (magnetically) transferring such format information and address information at a time from a master disk on which the information is written is effective and preferable.

In this kind of magnetic transfer technique or nanoimprinting technique, there is a need to maintain a master disk (transfer original disk) and a slave disk (transfer-destination medium) in closely-contacted state. If the degree of cleanness in the transfer environment is low, there is a problem that fine particles, dust or the like cause transfer failure or scratches or the like on the surface of the master disk.

As cleaning techniques, $CO_2$ cleaning, tape varnishing, a method of moving a foreign material by bringing a master disk into close contact with a substrate with NiP plating (dummy disk) (Japanese Patent Application Laid-Open No. 2001-176065), air blowing, plasma cleaning, scrub cleaning, ultrasonic cleaning, jet cleaning, a method using a cleaning roller (self-adhesive tape) (Japanese Patent Application Laid-Open No. 48-35771, Japanese Patent No. 3346660) and other techniques are known.

SUMMARY OF THE INVENTION

Each of the conventional techniques, however, has a drawback. That is, $CO_2$ cleaning is effective in removing inorganic materials but has substantially no effect in removing organic materials and leaves a watermark after cleaning. Tape varnishing entails the generation of dust with a tape. If hard dust is generated, it is dragged on the disk surface after removal to cause a scratch on the surface.

The method of using a dummy disk (Japanese Patent Application Laid-Open No. 2001-176065) has a low cleaning effect on a master made of a material having a low surface hardness with respect to the dummy disk. The dust removal effect of air blowing is low. Plasma cleaning has no metal removal effect and has a drawback in that the master surface is oxidized and the removal speed is low. Each of scrub cleaning, ultrasonic cleaning and jet cleaning tends to damage the master surface. Each of these cleaning methods requires removing the disk from the unit to enable cleaning and has low adaptability to a manufacturing line (on-line adaptability). Further, the dust removal effect of the method of using a conventional cleaning roller described in Japanese Patent Application Laid-Open No. 48-35771 is low.

Dust attached to a master disk by adhesion and transfer in magnetic transfer or nanoimprinting is dust collapsed by high-pressure pressing and attached to the disk. The attachment of this dust is based on adhesion or biting in the master. Thus, it is difficult to remove a strongly attached foreign material by any of the conventional cleaning techniques, and foreign materials are attached in different forms. It is, therefore, difficult to remove all foreign materials by one method. It has been experimentally confirmed that a removal method using a physical force is most effective in increasing both the effect of removing organic materials and the effect of removing inorganic materials.

In view of the above-described circumstances, an object of the present invention is to provide a master disk cleaning method and apparatus capable of effectively removing both organic and inorganic materials and introducible into a manufacturing line (applicable in on-line form).

To achieve the above-described object, according to an aspect of the present invention, there is provided a method of cleaning a master disk by removing dust attached on the master disk, including bringing a part of a curved portion of a self-adhesive member formed so as to have a curved self-adhesive surface facing outward into contact with the master disk, and reciprocatingly oscillating the self-adhesive member along a disk plane direction of the master disk while maintaining the part of the curved portion in a state of being pressed against the master disk.

According to the aspect, a self-adhesive surface sticking/peeling operation is performed on dust on the master disk by reciprocatingly oscillating the self-adhesive member while applying external forces in a plurality of directions. Dust on the master disk can be effectively removed by moving the self-adhesive member in this way and by using the adhesion of the self-adhesive member. Since the cleaning method according to the present invention is a removal method using a physical force, it has both the effect of removing organic materials and the effect of removing inorganic materials. Further, according to the present invention, the master disk to be cleaned can be cleaned in a state of being mounted on a disk holding member such as a holder. Therefore an apparatus of a comparatively simple construction can be applied in on-line form according to the cleaning method.

In another aspect of the present invention, a master disk cleaning method is provided in which if a width in a direction of the reciprocating oscillation of an area of landing of the self-adhesive member maintained in contact with the master disk while being in the pressed state is a; and a peak-to-peak amplitude of the reciprocating oscillation is b, $a \geq b$ is satisfied.

According to the aspect, the self-adhesive member is not relatively rubbed on the master disk during reciprocating oscillation. Therefore, the disk surface is not scratched by removed dust.

In another aspect of the present invention, a self-adhesive sheet is used as the self-adhesive member to form a looped shape of the self-adhesive sheet so that a self-adhesive surface of the self-adhesive sheet faces outward, and the reciprocating oscillation is performed while pressing a part of the looped shape against the master disk.

According to the aspect, the removal ability can be maintained by only changing the self-adhesive sheet. Only the self-adhesive sheet exists as an essential consumable, so that the running cost can be limited.

In still another aspect of the present invention, the part of the curved portion in contact with the master disk is separated from the master disk while a peeling angle is formed along a lengthwise direction of the self-adhesive member.

According to the aspect, no self-adhesive material remains on the master disk, because the part of the curved portion in contact with the master disk is separated from the master disk while a peeling angle is formed along the lengthwise direction of the self-adhesive member.

In a further aspect of the present invention, the peeling angle is formed by inclining the self-adhesive member along the lengthwise direction of the self-adhesive member with respect to the master disk.

According to the aspect, the peeling angle can be controlled on the side of an apparatus for implementation of the cleaning method. Therefore, the peeling angle can be controlled with improved accuracy when the part of the curved portion in contact with the master disk is separated from the master disk.

In still a further aspect of the present invention, the peeling angle is formed by forming the part of the curved portion so that the self-adhesive member is inclined along the lengthwise direction of the self-adhesive member with respect to the master disk when the self-adhesive member and the master disk are disposed by being opposed to each other.

According to the aspect, there is no need to provide a mechanism for controlling the peeling angle on the side of an apparatus for implementation of the cleaning method. Therefore the construction of the apparatus can be simplified.

The present invention also provides an apparatus for achieving the above-described object. That is, the present invention provides an apparatus for cleaning a master disk by removing dust attached on the master disk, comprising: a disk holding device which holds the master disk, a cleaning head on which a self-adhesive member formed so as to have a curved self-adhesive surface facing outward is held, a head drive device which moves the cleaning head along a direction perpendicular to a disk surface of the master disk held by the disk holding device and along a disk plane direction parallel to the disk surface, and a control device which controls the head drive device to bring a part of a curved portion of the self-adhesive member into contact with the master disk and to reciprocatingly oscillate the self-adhesive member along the disk plane direction of the master disk while maintaining the part of the curved portion in a state of being pressed against the master disk.

According to the present invention, the dust removal effect can be improved to enable removal of dust with high efficiency in comparison with the conventional method of simply performing sticking and peeling based on the adhesion of a self-adhesive material only. The present invention therefore enables effectively removing even dust firmly attached on the disk surface by pressing at a high pressure. Also, the present invention ensures high removal ability with respect to either of organic and inorganic materials, because it is a dust removal method using a physical external force. Further, the present invention enables cleaning without detaching the master disk from the apparatus and therefore enables application in on-line form.

BRIEF DESCRIPTION OF THE DRAWINGS

FIG. 15 is a perspective view corresponding to FIG. 13B; and

DETAILED DESCRIPTION OF THE PREFERRED EMBODIMENTS

Preferred embodiments of the present invention will be described below with reference to the accompanying drawings.

First Embodiment

[Example of Configuration of Cleaning Apparatus]

Figure 1:
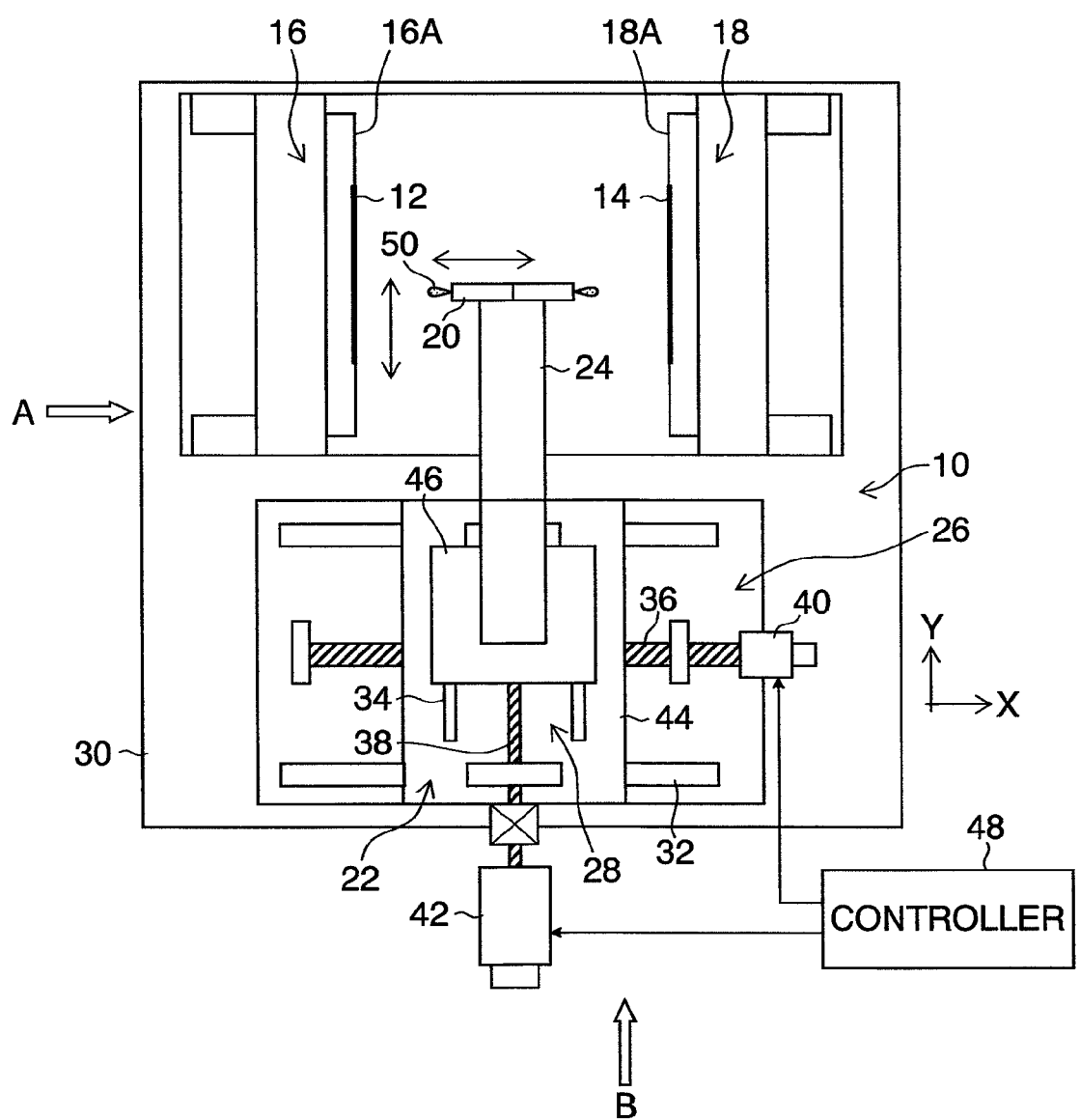
FIG. 1 is a plan view of the construction of a cleaning apparatus according to an embodiment of the present invention.
Figure 2:
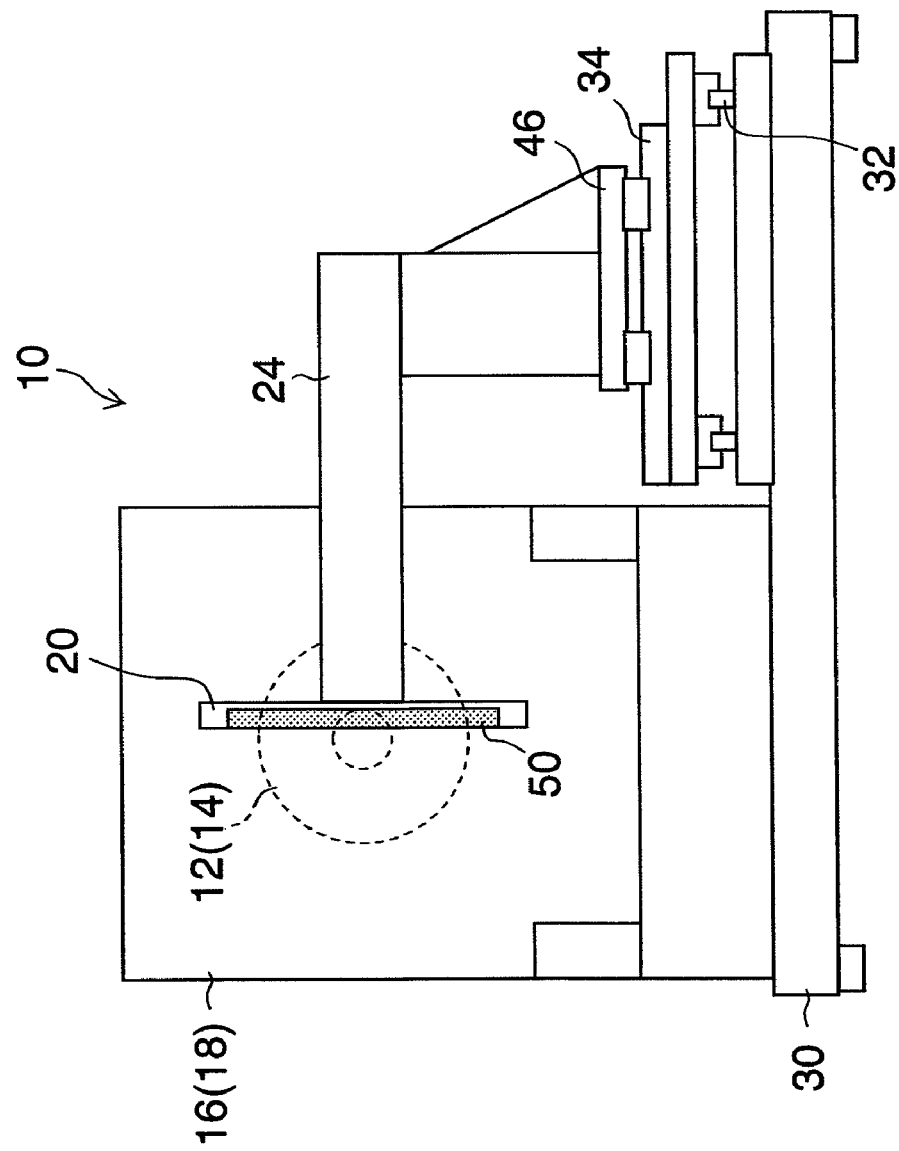
FIG. 2 is a side view seen in the direction of arrow A in FIG. 1.
Figure 3:
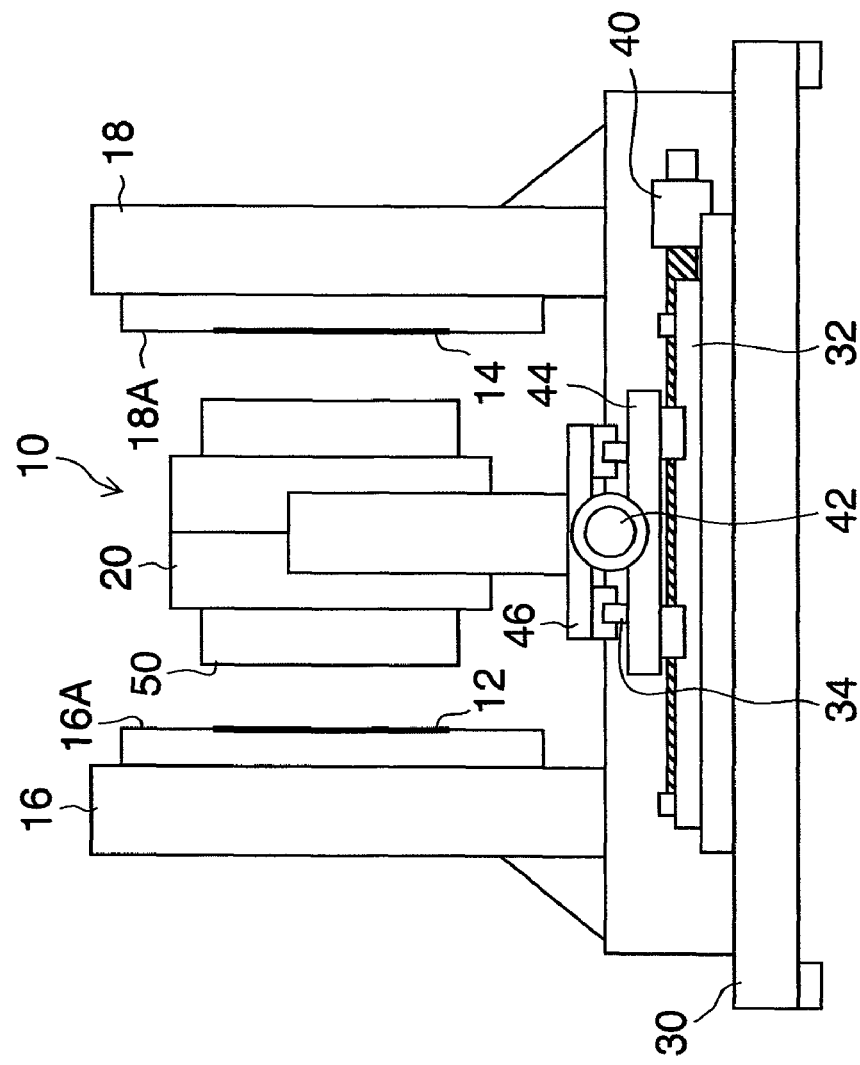
FIG. 3 is a side view seen in the direction of arrow B in FIG. 1.

FIG. 1 is a plan view of a cleaning apparatus according to an embodiment of the present invention. FIG. 2 is a side view seen in the direction of arrow A in FIG. 1. FIG. 3 is a side view seen in the direction of arrow B in FIG. 1.

As shown in these figures, the cleaning apparatus 10 has, as its main components, holder units 16 and 18 on which master disks 12 and 14 are held, a drive unit 22 having a device for driving a cleaning head 20, and a base plate 30.

The holder units 16 and 18 have disk holding surfaces 16A and 18A on which the master disks 12 and 14 are held in a vertically upright attitude (such that the disk surface is parallel to a vertical line). The disk holding surfaces 16A and 18A of the holder units 16 and 18 face each other while being spaced apart from each other by a predetermined distance. The holder units 16 and 18 are positioned and fixed on the base plate 30.

The drive unit 22 has a first-axis drive mechanism 26 which moves the cleaning head 20 attached to an end of an arm 24 in a direction perpendicular to the disk surface (the first axis: X-axis in FIG. 1) and a second-axis drive mechanism 28 which moves the cleaning head 20 in a direction parallel to the disk surface (the second axis: Y-axis in FIG. 1). The drive unit 22 is positioned and fixed on the base plate 30.

The arm 24 may have a turning function to enable the cleaning head 20 to have its lengthwise direction at any angle from the disk holding surface 16A or 18A, as described below.

The first-axis and second-axis drive mechanisms 26 and 28 are respectively constituted by linear rails 32 and 34 disposed along their axes, ball screws 36 and 38, motors 40 and 42 and slider tables 44 and 46. The first-axis and second-axis drive mechanisms 26 and 28 form an XY stage, which is two-axis motor controlled.

The cleaning head 20 is pressed against the disk surface and moved apart from the disk surface by the first-axis drive mechanism 26. An operation to oscillate the cleaning head 20 and lateral translation of the cleaning head 20 are performed by the second-axis drive mechanism 28. Each of the motors 40 and 42 is connected to a controller 48 and controlled in accordance with a sequence described below.

The base plate 30 is a base member for setting (positioning) and fixing the holder units 16 and 18 and the drive unit 22 in a specified relative positional relationship. It is preferable that the holder units 16 and 18 and the drive unit 22 be constructed so as to be detachably attached to the base plate 30.

A self-adhesive sheet 50 having a width larger than the external shape (diameter) of the master disks 12 and 14 is fixed on the cleaning head 20, forming a loop so that its adhesive surface faces outward (forms an external surface). The portion of the adhesive sheet 50 forming such a loop will be referred to simply as "loop". In the present embodiment, a two-head structure is adopted in which two cleaning heads 20 are disposed back to back in correspondence with two holder units 16 and 18. However, an apparatus construction using one head capable of facing each of two holder units 16 and 18 may alternatively be adopted. Such a construction may be implemented by providing a rotating (inverting) mechanism on a head portion while removing the head on one side.

Figure 4:
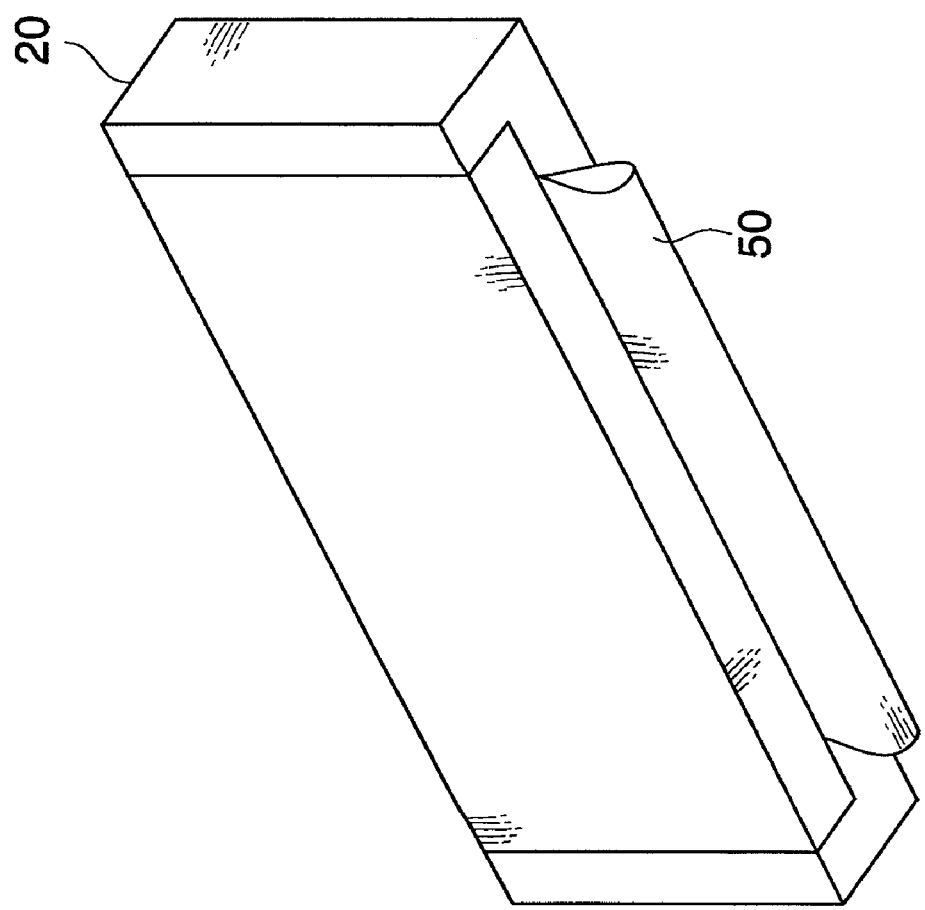
FIG. 4 is a diagram showing the construction of a cleaning head.

FIG. 4 shows the construction of the cleaning head 20. As self-adhesive sheet 50, a rectangular sheet of a predetermined size cut out from a roll is used. This rectangular self-adhesive sheet is roundly bent into a looped shape by turning its one end, with the self-adhesive surface facing outward. The turned end and the other end are superposed on each other and pinched in a head jig (block) as illustrated, thus attaching the adhesive sheet 50. In this way, a loop 52 in tear drop form is obtained. The held form of the self-adhesive sheet 50 is not limited to the example shown in FIG. 4. The self-adhesive sheet 50 may be held in any other form in which the self-adhesive sheet is formed into a curved shape with the self-adhesive facing outward.

For example, BT-150E-KL (trade name), a product from NITTO DENKO CORPORATION, may be used as the self-adhesive sheet 50. Good reseparability is required as a performance characteristic of the self-adhesive sheet to be used. If the reseparability is low, the self-adhesive material is attached to the master disk to contaminate the same.

Figure 5:
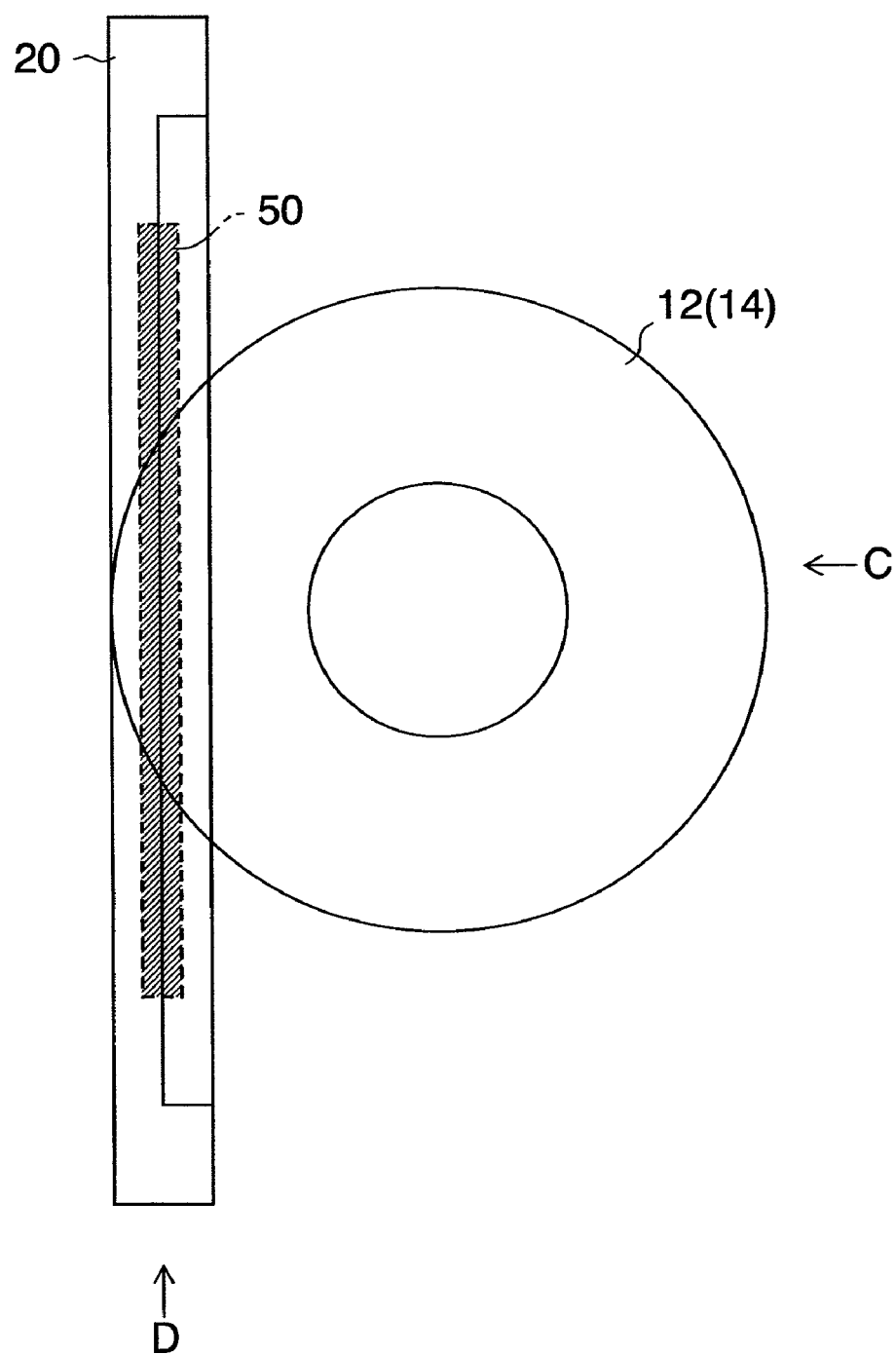
FIG. 5 is a diagram showing a state when cleaning is performed.
Figure 6:
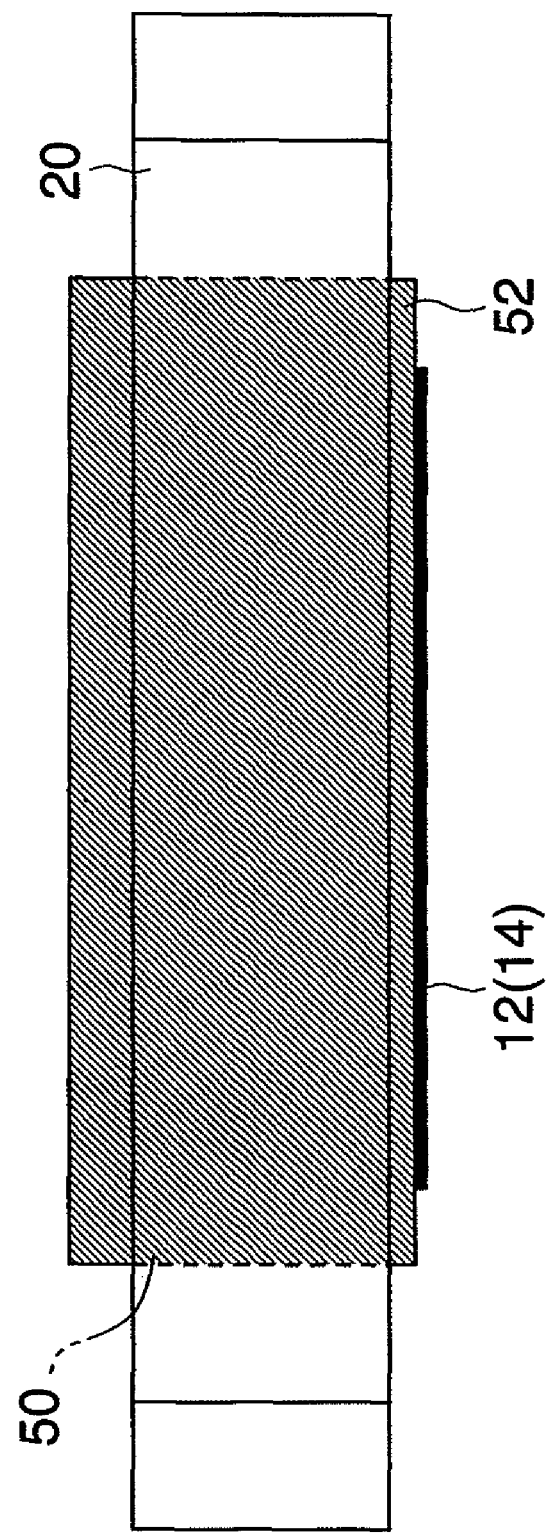
FIG. 6 is a side view seen in the direction of arrow C in FIG. 5.
Figure 7:
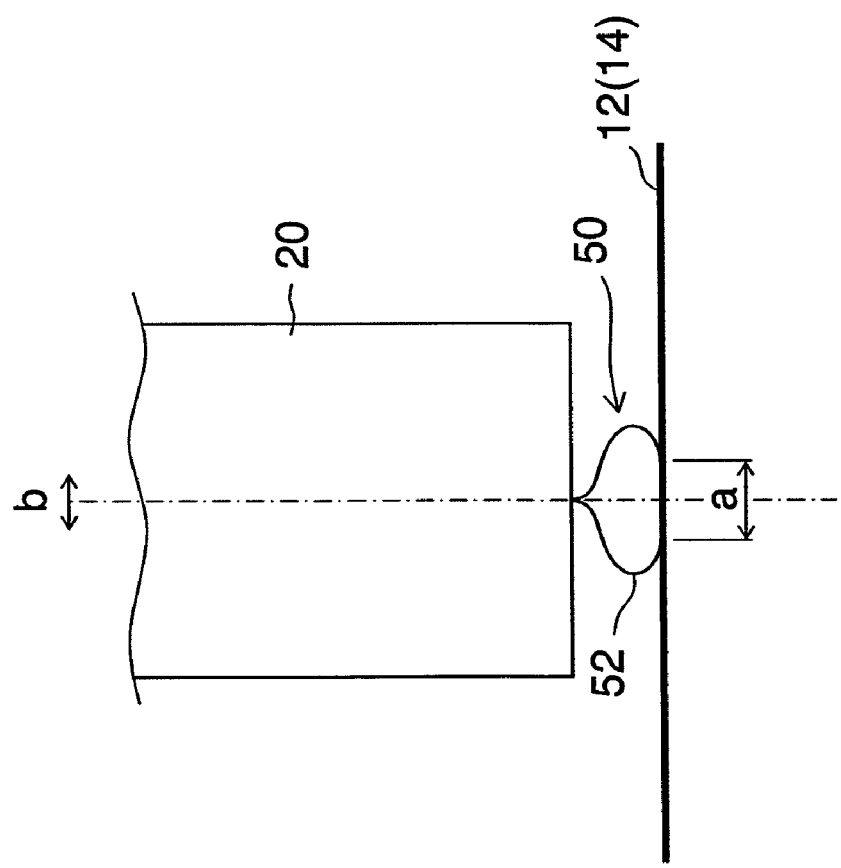
FIG. 7 is an enlarged side view seen in the direction of arrow D in FIG. 5.

FIG. 5 is a diagram showing a state where cleaning is performed. FIG. 6 is a side view seen in the direction of arrow C in FIG. 5. FIG. 7 is an enlarged side view seen in the direction of arrow D in FIG. 5. Hatched portions in FIGS. 5 and 6 represent the self-adhesive sheet 50.

As shown in these figures, when cleaning is performed, the loop 52 of the self-adhesive sheet 50 is brought into contact with the master disk 12 (or 14) and pressed against the master disk 12 (or 14) to such a degree that the loop 52 is not completely collapsed. In this pressed state, the cleaning head 20 (i.e., the loop 52) is reciprocated (swung) in a direction along the disk surface.

In oscillating the loop 52 without dragging (rubbing) on the disk surface, it is preferable that if the width of the contact area of the loop 52 in the oscillating direction formed by pressing is a; and the peak-to-peak amplitude of oscillation is b (the zero-to-peak amplitude is b/2), $a \geq b$ is satisfied (see FIG. 7). For example, in the case of cleaning of a master disk having a diameter of about 65 mm, it is preferable that the width a of the contact area when the self-adhesive sheet 50 is pressed and collapsed be within the range from 1 to 5 mm. For example, the peak-to-peak amplitude b is set to 2.5 mm when the width a of the contact area is 3 mm.

Thus, the self-adhesive sheet 50 is made to move on the master disk 12 (14) so that adhesion and peeling on a small scale are repeated. In particular, it is desirable to peel off the self-adhesive sheet 50 by applying an external force in a direction parallel to the master disk surface while the self-adhesive sheet 50 in contact with the master disk 12 (14) is being pressed against dust as effectively as possible.

The shape of the loop 52 in the pressed state (the degree of flatness during pressing and collapsing) and the contact area (corresponding to "landing area") vary depending on the rigidity (elasticity) of the self-adhesive sheet 50, the force by which the loop 52 is pressed against the disk surface and the like. From the viewpoint of dust removal performance, the optimum conditions (such as conditions in terms of contact area and oscillation amplitude, conditions in terms of oscillation (reciprocating) period and the number of oscillations and a condition in terms of pressing force) are experimentally determined in advance on the basis of the characteristics of the self-adhesive sheet 50 to be used (such as the rigidity, elasticity and adhesion of the sheet).

Figure 8:
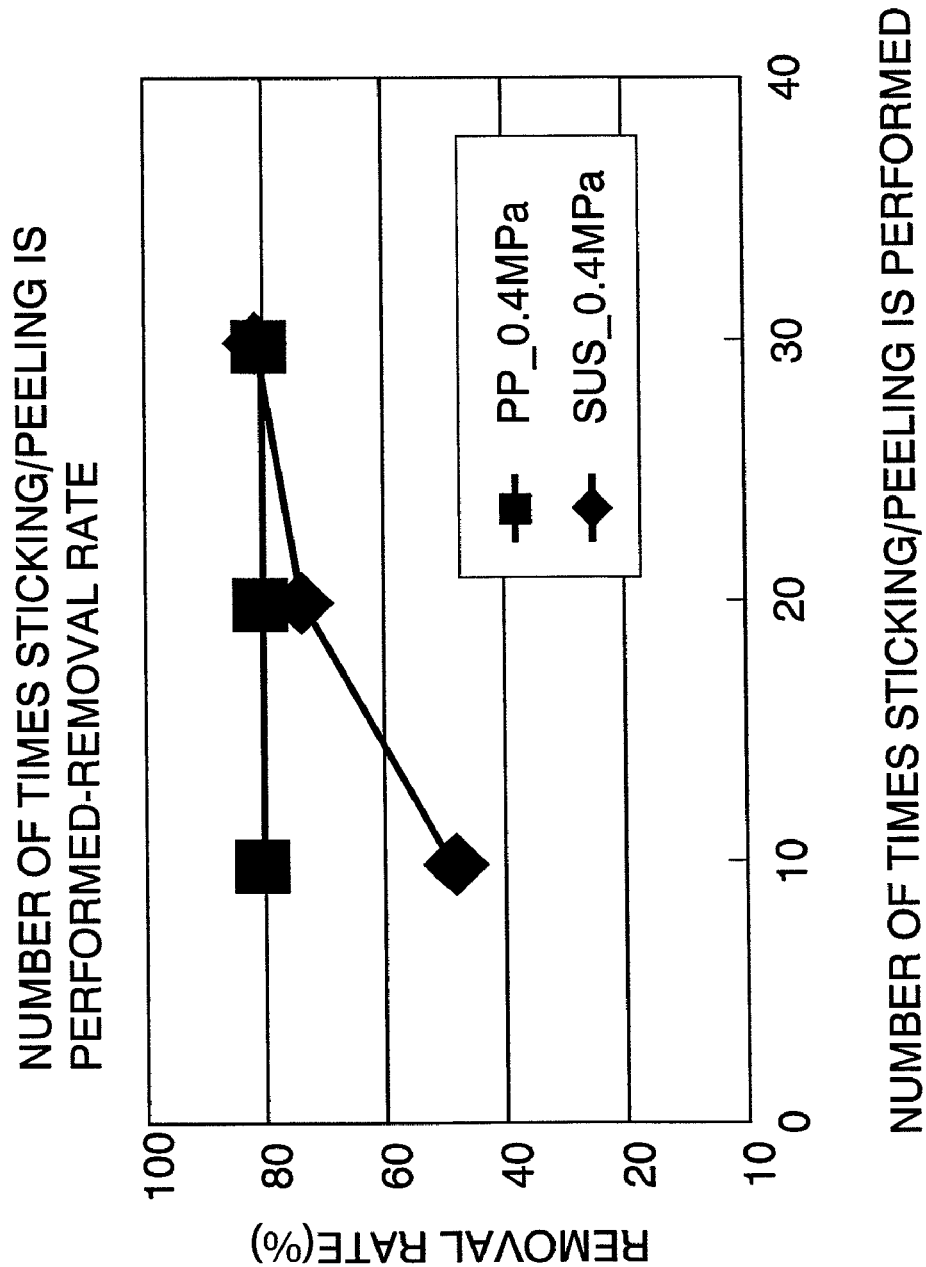
FIG. 8 is a graph showing the results of an experiment in which the relationship between the number of times sticking/peeling was performed and the rate of the dust removal effect.

For example, in an experiment made to examine the relationship between the number of sticking/peeling oscillations and the rate of removal of dust attached to a master with respect to a standard powder (polypropylene, SUS) collapsed at a disk adhesion pressure of 0.4 MPa in a case where BT-150E-KL (trade name), a product from NITTO DENKO CORPORATION, was used as the self-adhesive sheet, experimental results such as shown in FIG. 8 were obtained when the contact width was set to 3 mm, the oscillation amplitude to 2.5 mm, the reciprocating time to 1 second/reciprocation, and the head translation pitch to 1 mm. According to the experimental results shown in FIG. 8, a dust removal rate of 80% was achieved with respect to polypropylene when the number of sticking/peeling oscillations was 10 or more; a dust removal rate of 70% was achieved with respect to SUS (stainless steel) when the number of sticking/peeling oscillations was 20 or more; and a removal rate of 80% was achieved with respect to SUS when the number of sticking/peeling oscillations was 30 or more.

From these results and the results of other experiments in which different conditions were set, it is known that making sticking/peeling oscillations 30 to 40 times suffices for achieving a dust removal rate of 70% or more regardless of the kind of dust.

Figure 9:
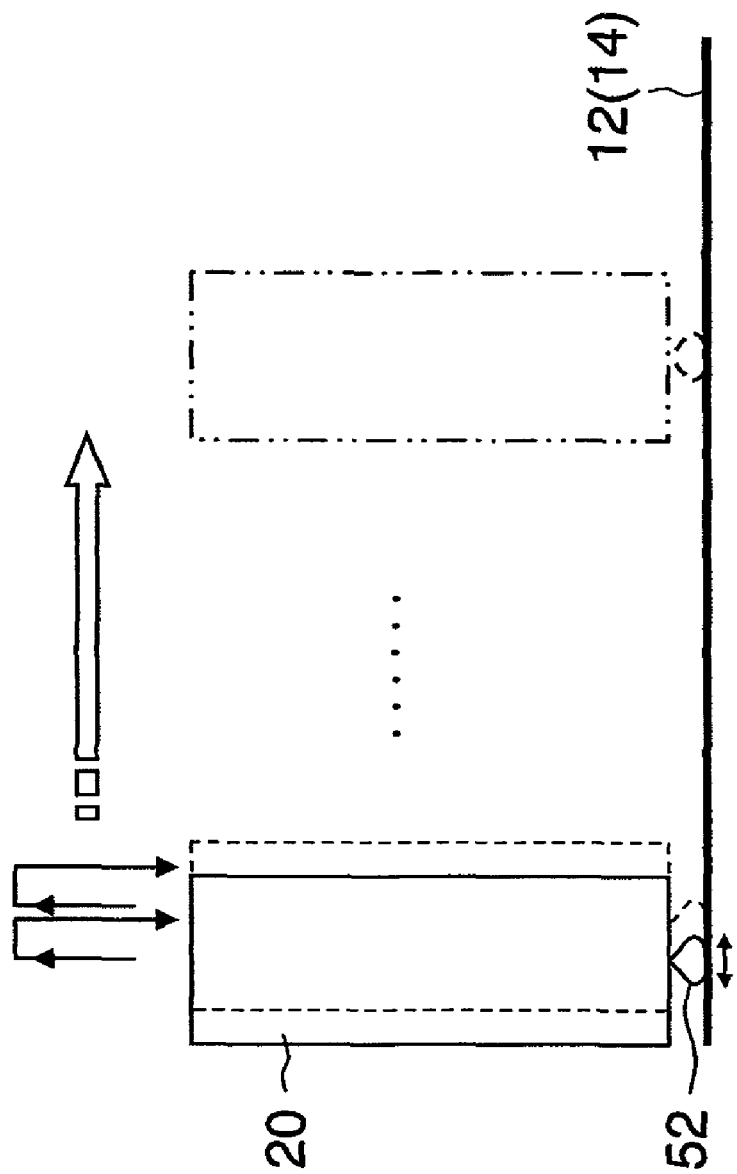
FIG. 9 is a diagram showing translation of the cleaning head.

On the basis of this knowledge, the amount of pressing of the loop 52 (contact area), the oscillation amplitude, the oscillation period, the number of oscillations and other conditions are controlled. Cleaning based on the above-described oscillating operation is performed at each of different positions (cleaning positions on the disk) to which the cleaning head 20 is fed with a predetermined pitch, as shown in FIG. 9.

That is, cleaning based on the above-described oscillating operation is repeatedly performed through a stroke range corresponding to the entire area of the disk while changing the position (the cleaning position on the disk) of the cleaning head 20 with a predetermined translation pitch. It is preferable that the head translation pitch be equal to or smaller than the width a of the contact area. In particular, it is preferable to set the head translation pitch equal to or smaller than the zero-to-peak amplitude (b/2) of oscillation. That is, if head translation pitch$\leq$b/2 is satisfied, the sticking/peeling oscillating operation can be performed at least two times in two directions on one batch of dust. For example, if the translation pitch is set to 1 mm in condition setting when a=3 mm and b=2.5 mm, sticking/peeling can be performed in two directions on one batch of dust.

[Description of Cleaning Sequence]

Figure 10:
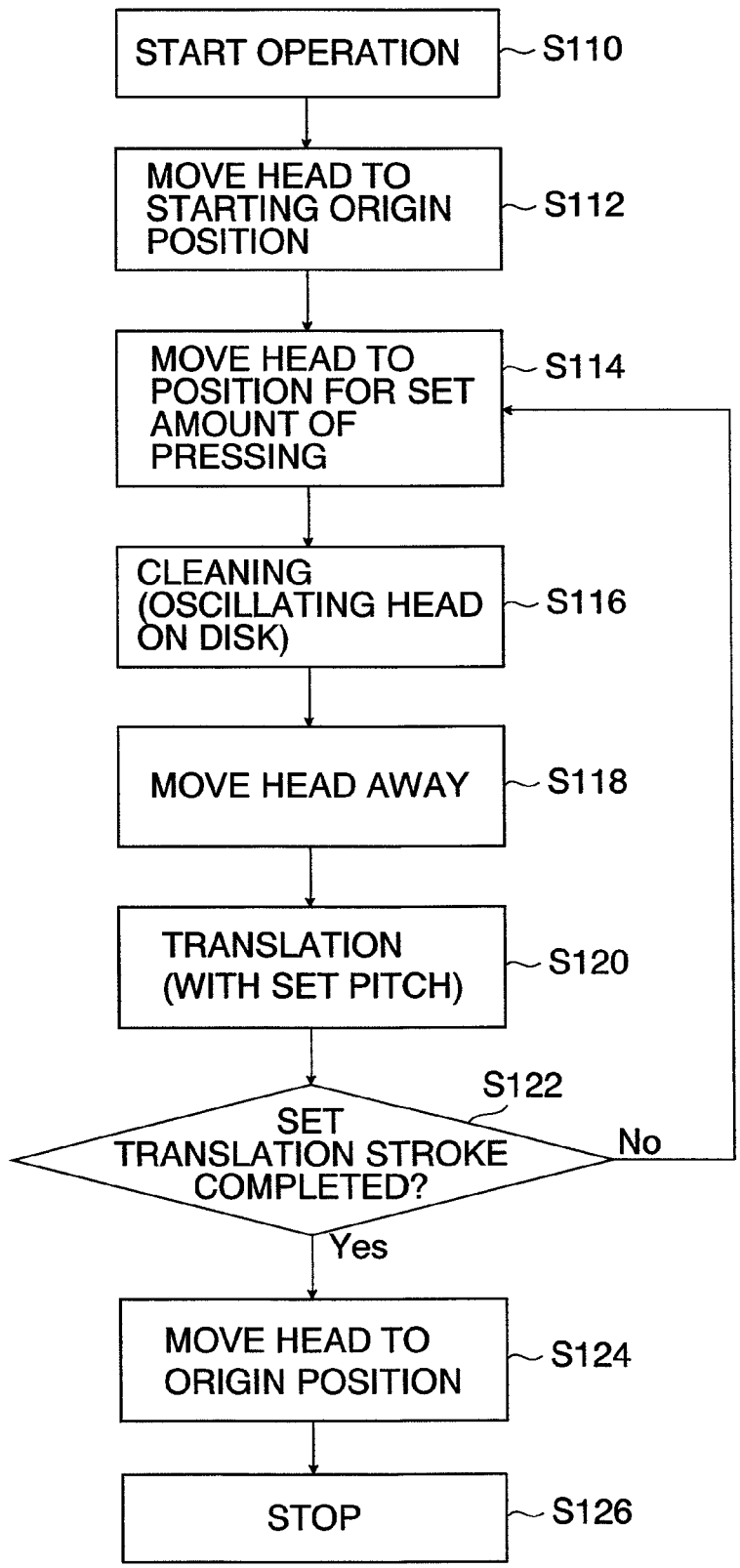
FIG. 10 is a flowchart showing a cleaning sequence in the cleaning apparatus according to the embodiment.

FIG. 10 is a flowchart showing a cleaning sequence in the cleaning apparatus according to the present embodiment.

When the operation of the apparatus is started (step S110), the cleaning head 20 is first moved to a starting origin position (step S112). For example, in a case where cleaning is performed by moving from the left end of the disk to the right as viewed in FIG. 9, the leftmost cleaning position corresponds to the starting origin position.

Next, the head is moved to the position for the set amount of pressing (step S114). This movement is caused in the direction of bringing the loop 52 into contact with the master disk 12 (14) (X-axis direction in FIG. 1). Cleaning is performed by reciprocating the head with the peak-to-peak amplitude b (zero-to-peak amplitude b/2) in the Y-axis direction under the condition for realizing the predetermined contact area (width a) (step S116). Sticking/peeling cleaning by this small amount of oscillation is executed for a predetermined time (or until a predetermined number of reciprocating oscillations is reached). The cleaning head 20 is thereafter moved away from the disk (step S118) to separate the loop 52 from the disk surface.

The head is then translated by the distance corresponding to the translation pitch set in advance (step S120). Determination is made as to whether or not the movement of the head through the translation stroke set in advance has been completed by this head translation (step S122).

If the result of this determination is that the amount of movement corresponding to the predetermined translation stroke has not been reached, the process returns to step S114 and the above-described operation (steps S114 to S122) is repeated. Cleaning on the entire area of the disk is executed by performing the cleaning operation at each position while translating the head with the predetermined pitch. When the cleaning on the entire area of the disk is finished by completing the movement through the predetermined translation stroke, the result of determination in step S122 is Yes, that is, it is determined that the movement through the predetermined translation stroke has been completed.

In this case, the head is moved to the origin position (step S124) and the operation of the apparatus is stopped (step S126).

In the case of the construction provided with the two holder units 16 and 18 shown in FIG. 1, the above-described processing flow (steps S110 to S126) is executed for the holder units 16 and 18 one from another. That is, when the processing flow shown in FIG. 10 is completed with respect to the disk held on one holder unit (on one side) (e.g., the one indicated by 16), the head is moved to the (other) holder unit on the opposite side (e.g., the one indicated by 18 in this case), followed by the same processing.

The controller 48 shown in FIG. 1 includes a storage device storing a program for controlling the drive unit 22 of the cleaning apparatus 10 by the sequence as shown in FIG. 10, and a computer which executes the program.

(Modified Example)

Figure 11:
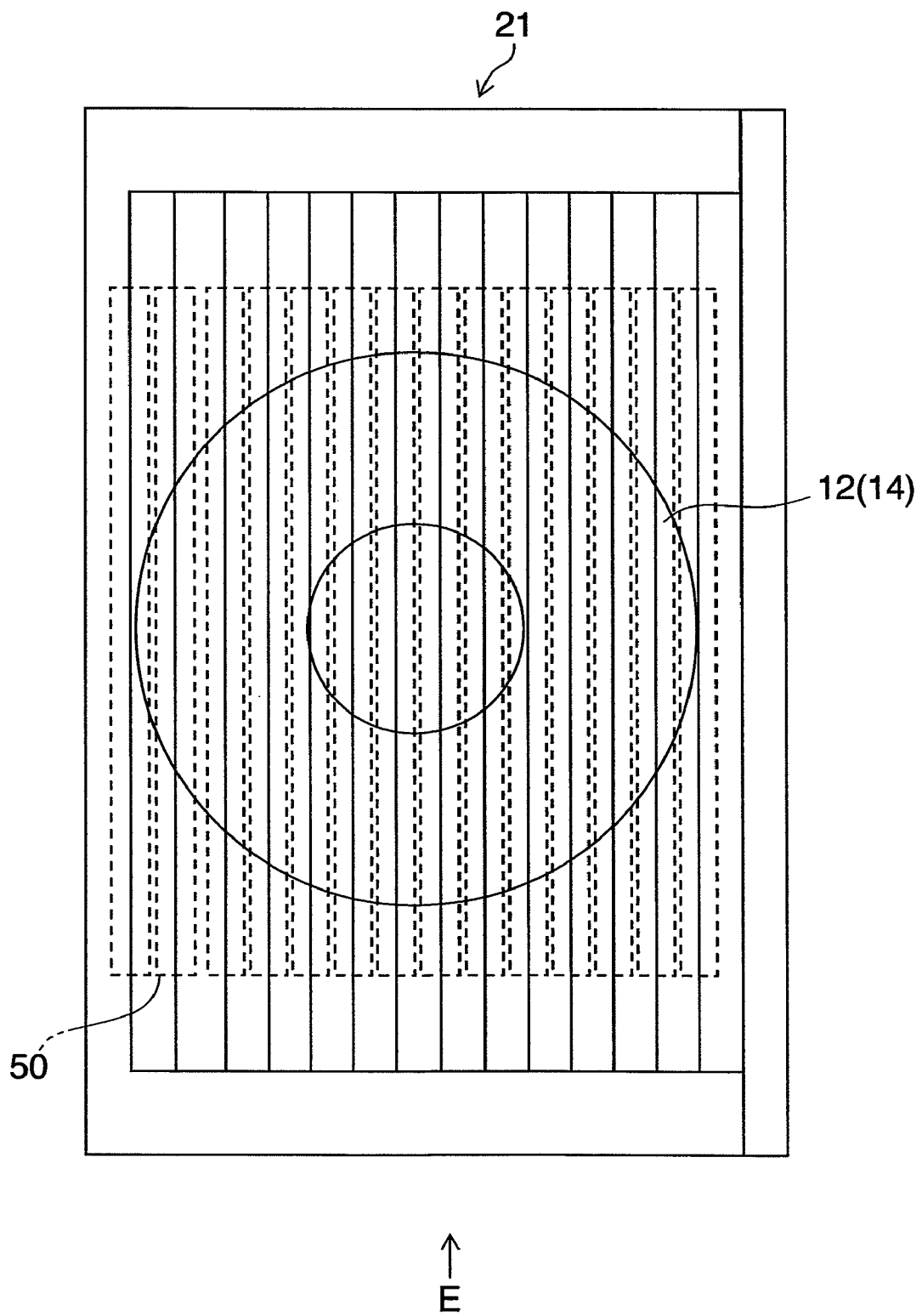
FIG. 11 is a diagram showing an example of the construction of a multiple-column head having a plurality of self-adhesive sheet loops in multiple-column form.
Figure 12:
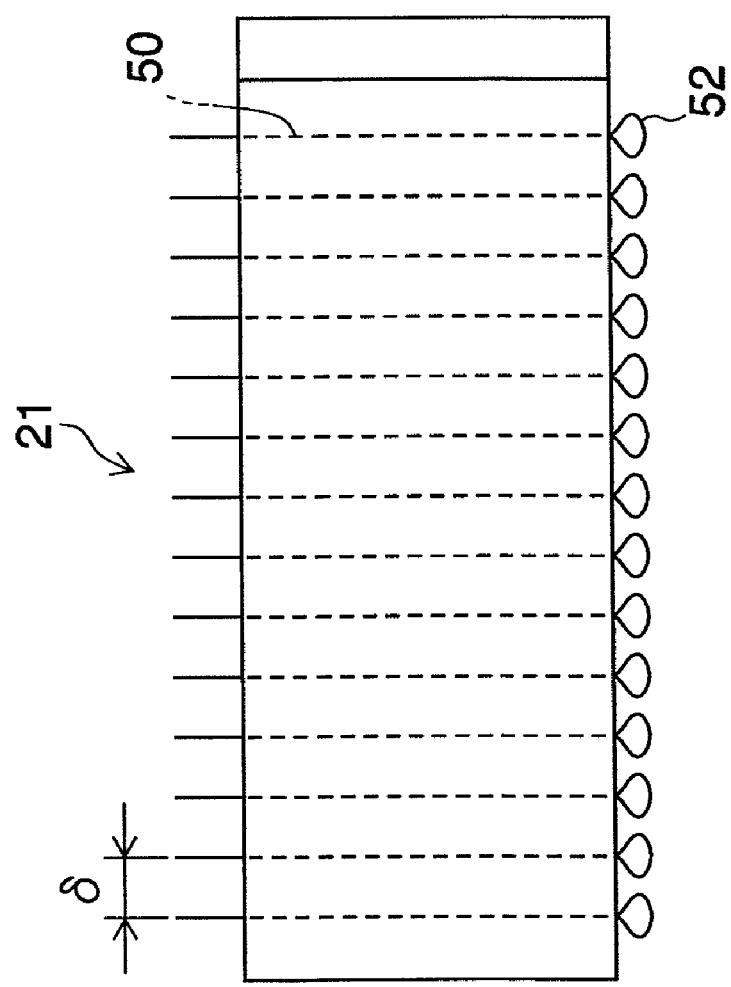
FIG. 12 is a side view seen in the direction arrow E in FIG. 11.

While one-column cleaning head 20 is used in the apparatus shown in FIG. 1, a multiple-column head 21 having loops 52 arranged at certain intervals (arrangement pitch δ) in multiple column form, as shown in FIGS. 11 and 12, may be used, whereby the number of times pitch translation is performed can be reduced to improve the cleaning efficiency.

The arrangement using the multiple-column head 21 having an array of a plurality of columns as shown in FIGS. 11 and 12 enables increasing the area of cleaning performed one time and enables the entire disk surface to be cleaned by pitch translation with a pitch equal to about half the arrangement pitch δ of the self-adhesive loops, thus improving the cleaning efficiency.

Second Embodiment

A second embodiment of the present invention has a feature relating to step S118 in the flowchart representing the cleaning sequence shown in FIG. 10. More specifically, the feature relates to the operation to separate the loop 52 of the self-adhesive sheet 50 from the disk surface 12A (14A) of the master disk 12 (14) by moving the cleaning head 20 away from the master disk 12 (14). In other respects, the sequence of the second embodiment is the same or similar to the example described in the description of the first embodiment. The description of the same or similar details of the sequence will not be repeated.

With respect to step S118 shown in FIG. 10, a method of separating the loop 52 from the disk surface 12A (14A) by moving the cleaning head 20 away from the disk surface 12A (14A) directly in the direction perpendicular to the disk surface 12A (14A) is conceivable.

In the second embodiment, however, a method of separating the loop 52 from the disk surface 12A (14A) while forming a peeling angle between the loop 52 and the disk surface 12A (14A) is proposed.

Figure 13A:
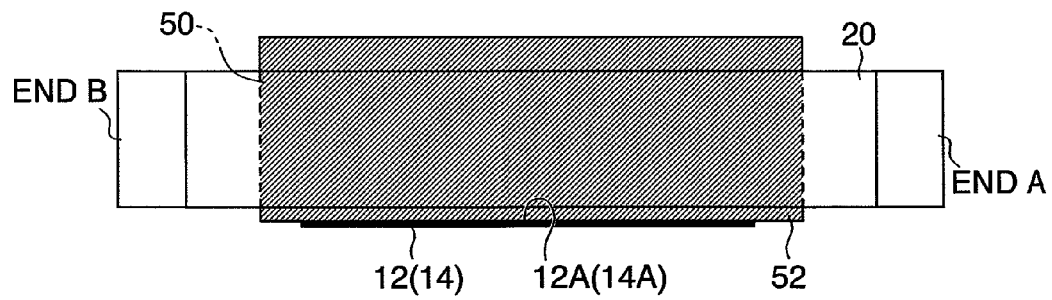
FIGS. 13A to 13C are diagrams showing the peeling angle formed between the loop of the self-adhesive sheet and the master disk when the loop of the self-adhesive sheet is separated from the disk surface of the master disk.
Figure 13B:
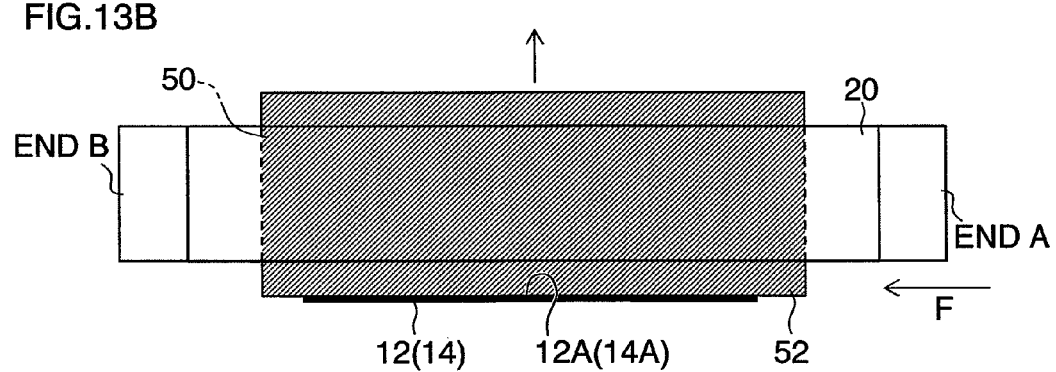
Figure 13C:
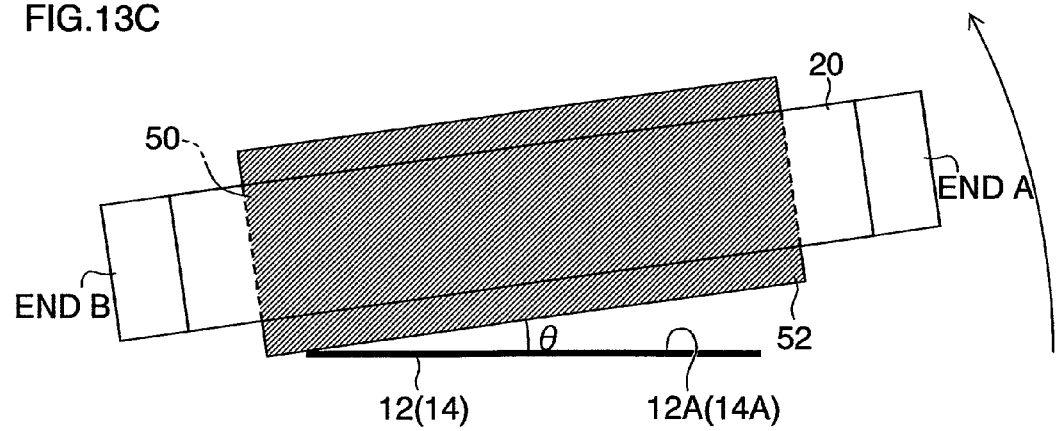

This method will be described below in detail. FIGS. 13A to 13C are diagrams showing separation of the loop 52 from the disk surface 12A (14A) in the second embodiment.

FIG. 13A is a side view (FIG. 6) seen in the direction of arrow C in FIG. 5, showing a state in which the loop 52 is brought into contact with the disk surface 12A (14A) with the contact width a by being pressed against the disk surface 12A (14A) by the cleaning head 20.

From the state shown in FIG. 13A, the cleaning head 20 is moved away from the disk surface 12A (14A) in the direction perpendicular to the disk surface (an upward direction as viewed in the figure), as shown in FIG. 13B. The amount of pressing of the loop 52 against the disk surface 12A (14A) is thereby reduced, so that the loop 52 and the disk surface 12A (14A) are made to contact each other with a contact width a'. The relationship between the contact widths a and a' is a>a'. The area of contact between the loop 52 and the disk surface 12A (14A) is smaller in the state shown in FIG. 13B than in the state shown in FIG. 13A.

Figure 14:
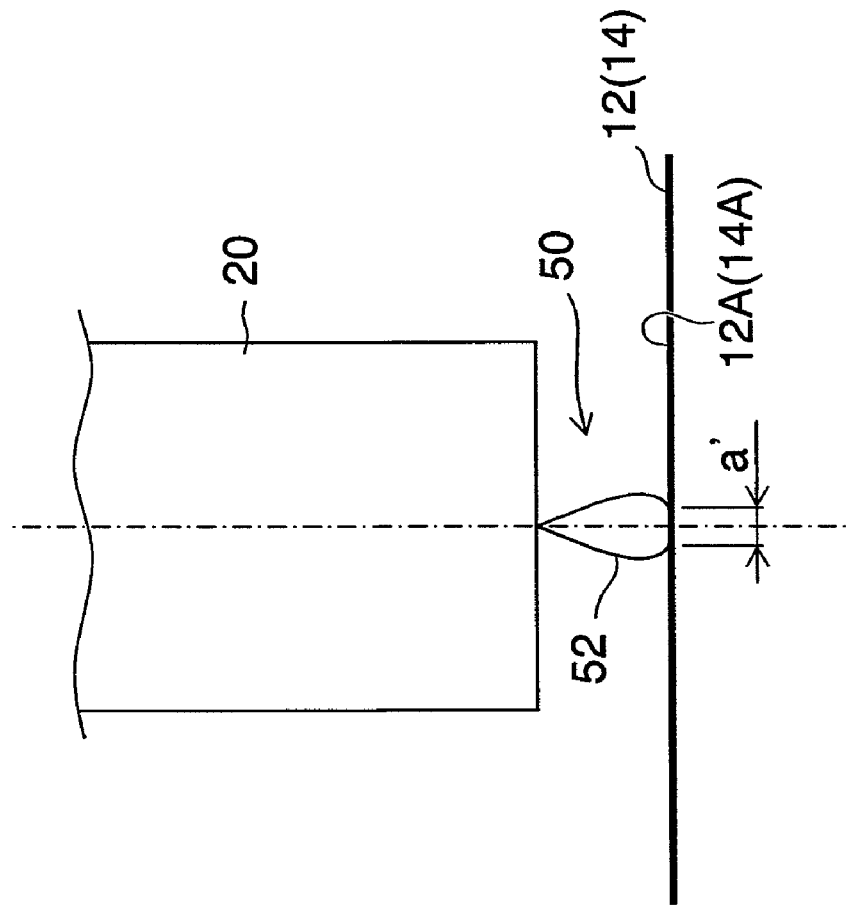
FIG. 14 is an enlarged side view seen in the direction of arrow F in FIG. 13B.

The state shown in FIG. 13B corresponds to a state such as seen in FIG. 14 along the lengthwise direction of the cleaning head 20. FIG. 14 is an enlarged side view seen in the direction of arrow F in FIG. 13B. FIG. 15 shows a corresponding perspective view.

Next, from the state shown in FIG. 13B, the loop 52 is separated from the disk surface 12A (14A) while forming a peeling angle θ therebetween along the lengthwise direction of the self-adhesive sheet 50, as shown in FIG. 13C. The reason for forming the peeling angle θ along the lengthwise direction of the self-adhesive sheet 50 in this way is as described below.

From the state shown in FIG. 13A to the state shown in FIG. 13B, the loop 52 is separated while being taken off in a state of having an arbitrary peeling angle from the disk surface 12A (14A). However, a stripping phenomenon occurs at the time of separation of the loop 52 from the disk surface 12A (14A) from the state shown in FIG. 13B, such that an extremely large peeling force is produced.

Then, the loop 52 is separated from the disk surface 12A (14A) while forming the peeling angle θ along the lengthwise direction of the self-adhesive sheet 50, as shown in FIG. 13C. The occurrence of the stripping phenomenon is prevented in this way. Therefore the interface adhesion between the disk surface 12A (14A) and the self-adhesive material does not prevail over the cohesion of the loop 52. As a result, the effect of preventing the occurrence of cohesion breakdown of the self-adhesive material that allows the self-adhesive material to remain on the disk surface 12A (14A) can be obtained.

The loop 52 may be separated from the disk surface 12A (14A) from the state shown in FIG. 13A to the state shown in FIG. 13B while forming the peeling angle θ along the lengthwise direction of the self-adhesive sheet 50 as shown in FIG. 13C without reducing the area of contact between the loop 52 and the disk surface 12A (14A).

The operation to separate the loop 52 from the disk surface 12A (14A) while forming the peeling angle θ along the lengthwise direction of the self-adhesive sheet 50 will be described in more detail. An operation to turn the cleaning head 20 for forming the peeling angle θ along to the lengthwise direction of the self-adhesive sheet 50 will be described with respect to cases relating to points on which the cleaning head 20 is turned to form the peeling angle θ along the lengthwise direction of the self-adhesive sheet 50.

A case where the arm 24 shown in FIGS. 1 and 2 has such a turning function as to turn the cleaning head 20 on an axis corresponding to a center of the cleaning head 20 in the lengthwise direction will first be considered.

In this case, the cleaning head 20 is turned through the predetermined angle θ on an axis corresponding to a center of the cleaning head 20 in the lengthwise direction so as to be moved away from the disk surface 12A (14A) at one end A (see FIG. 13) side and brought closer to the disk surface 12A (14A) at the other end B (see FIG. 13) side.

Then, the portion of the loop 52 from the end A side to the center in the lengthwise direction is gradually separated from the disk surface 12A (14A) while forming the peeling angle θ and is thereafter separated completely from the disk surface 12A (14A). On the other hand, the amount of pressing on the portion of the loop 52 from the center to the end B side in the lengthwise direction is increased to bend the loop 52.

Thereafter, the turning operation of the cleaning head 20 is stopped and the cleaning head 20 is gradually moved away from the disk surface 12A (14A) in the direction perpendicular to the disk surface 12A (14A) by the first-axis drive mechanism 26. The amount of pressing is then reduced in the region from the center of the loop 52 to the end B side in the lengthwise direction to reduce the amount of bending of the loop 52. Also, the loop 52 and the disk surface 12A (14A) are gradually separated from each other while forming the peeling angle θ. At this time, the area of contact between the loop 52 and the disk surface 12A (14A) is gradually reduced along the lengthwise direction of the self-adhesive sheet 50. When the cleaning head 20 is moved away to a predetermined distance from the disk surface 12A (14A), the loop 52 and the disk surface 12A (14A) are completely separated from each other. The loop 52 and the disk surface 12A (14A) can be separated from each other in the above-described way.

The loop 52 and the disk surface 12A (14A) can also be separated from each other in a similar way by turning the cleaning head 20 through the predetermined angle θ on an axis corresponding to the center of the cleaning head 20 in the lengthwise direction so that the loop 52 is separated from the disk surface 12A (14A) at the end B side and is brought closer to the disk surface 12A (14A) at the end A side.

A case where the cleaning head 20 is turned on an axis at the end A side in the lengthwise direction of the cleaning head 20 will next be considered. In this case, the cleaning head 20 is turned through the predetermined angle θ on an axis at the end A side in the lengthwise direction of the cleaning head 20 so as to be lightly pressed against the disk 12 (14) at the end B side. While being maintained in this state, the cleaning head 20 is gradually moved away from the master disk 12 (14) in the direction perpendicular to the disk surface 12A (14A).

The loop 52 and the disk surface 12A (14A) are then separated gradually from each other from the end A side in the lengthwise direction of the cleaning head 20 while forming the peeling angle θ along the lengthwise direction of the self-adhesive sheet 50. At this time, the area of contact between the loop 52 and the disk surface 12A (14A) is gradually reduced along the lengthwise direction of the self-adhesive sheet 50. When the cleaning head 20 is moved away by a predetermined distance, the loop 52 and the disk surface 12A (14A) are completely separated from each other. The loop 52 and the disk surface 12A (14A) can be separated from each other in the above-described way.

The loop 52 and the disk surface 12A (14A) can also be separated from each other in a similar way by gradually separating the loop 52 and the disk surface 12A (14A) from the end B side in a case where an axis on which the cleaning head 20 is turned is set at the end B side in the longitudinal direction.

A case where the cleaning head 20 is turned on an axis at the end B side in the lengthwise direction of the cleaning head 20 will next be considered. In this case, the angle of turning of the cleaning head 20 on an axis at the end B side in the lengthwise direction of the cleaning head 20 is gradually increased so that the cleaning head 20 is moved away from the master disk 12 (14) at the end A side.

The loop 52 and the disk surface 12A (14A) are then separated gradually from each other from the end A side in the lengthwise direction of the cleaning head 20 while forming the peeling angle θ along the lengthwise direction of the self-adhesive sheet 50. At this time, the area of contact between the loop 52 and the disk surface 12A (14A) is gradually reduced along the lengthwise direction of the self-adhesive sheet 50.

When the angle of turning of the cleaning head 20 reaches a predetermined angle, the loop 52 and the disk surface 12A (14A) are completely separated from each other. The loop 52 and the disk surface 12A (14A) can be separated from each other in the above-described way.

The loop 52 and the disk surface 12A (14A) can also be separated from each other in a similar way by gradually separating the loop 52 and the disk surface 12A (14A) from the end B side in a case where an axis on which the cleaning head 20 is turned is set at the end A side in the longitudinal direction.

As described above, a mechanism for turning the cleaning head 20, e.g., a mechanism on the arm 24 is provided to control the peeling angle on the cleaning apparatus 10 side, thereby enabling more accurate peeling angle control at the time of separation between the loop 52 and the disk surface 12A (14A).

Figure 16A:
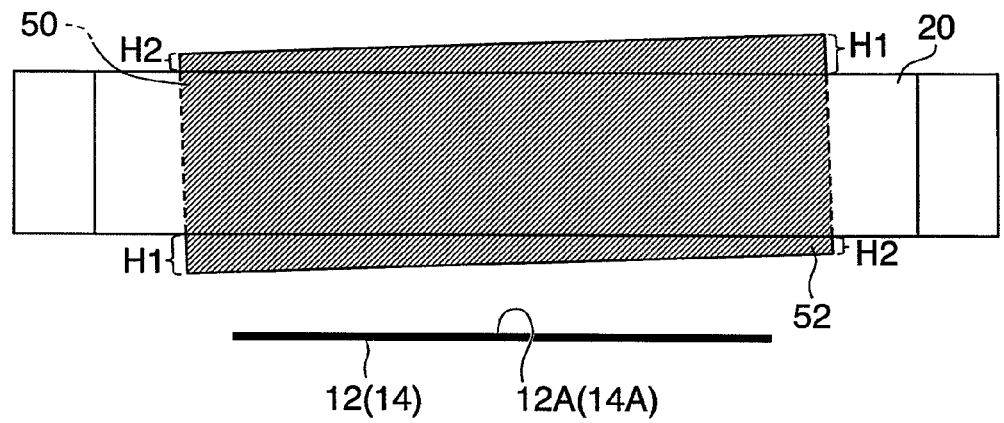
FIGS. 16A and 16B are diagrams showing examples of expansions of the self-adhesive sheet changing gradually along the lengthwise direction of the self-adhesive sheet.
Figure 16B:
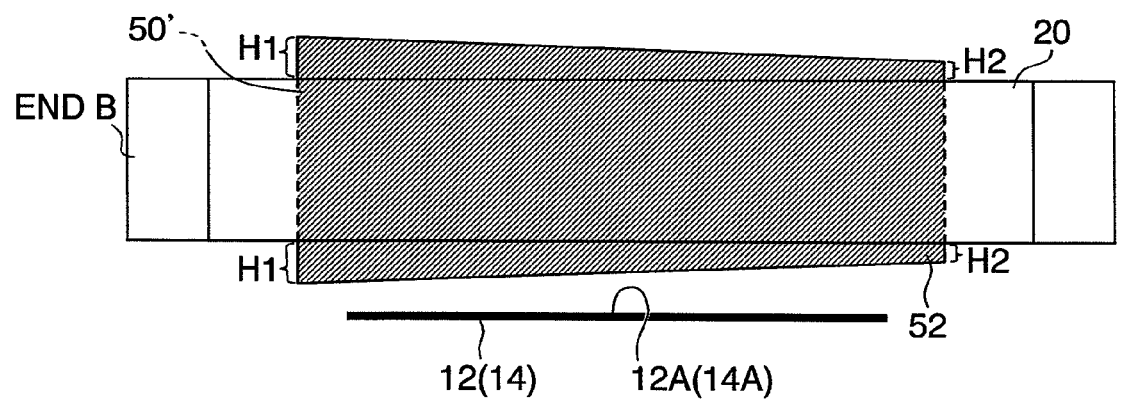

The arrangement may alternatively be such that the self-adhesive sheet 50 is attached to the cleaning head 20 in a slant position in advance as shown in FIG. 16A, or a self-adhesive sheet 50' formed into a trapezoidal shape as shown in FIG. 16B is attached to the cleaning head 20. In this way, the loop 52 can be set in a state of slanting slightly with respect to the disk surface 12A (14A) along the lengthwise direction of the self-adhesive sheet 50 when the loop 52 is opposed to the disk surface 12A (14A). Since there is no need to provide a mechanism for controlling the peeling angle on the cleaning apparatus 10 side, the construction of the cleaning apparatus 10 can be simplified.

More specifically, in expansions $H_1$ and $H_2$ of the loop 52 of the self-adhesive sheet 50 out of the cleaning head 20, the expansion $H_1$ on one side along the lengthwise direction of the self-adhesive sheet 50 and the expansion $H_2$ on the opposite side are set different from each other ($H_1 > H_2$ in FIGS. 16A and 16B), and the expansion of the self-adhesive sheet 50 changes gradually along the lengthwise direction of the cleaning head 20. The expansion $H_2$ is set at the side at which the loop 52 is first separated from the disk surface 12A (14A), while the expansion $H_1$ is set at the side of at which the loop 52 is finally separated from the disk surface 12A (14A).

As a result, separation of the loop 52 from the disk surface 12A (14A) forming the peeling angle θ along the lengthwise direction of the self-adhesive sheet 50 can be achieved by only moving the cleaning head 20 in the direction perpendicular to the disk surface 12A (14A).

The controller 48 shown in FIG. 1 also includes a storage device storing a program for controlling the operation according to the second embodiment and a computer which executes the program.

The present invention can be suitably applied as a technique to clean a master disk for magnetic transfer used in manufacture of a magnetic recording medium. However, the range of application of the present invention is not limited to this. The present invention is applicable to any transfer apparatuses for transferring magnetic information, shape information or the like by bringing a transfer original and a transfer-destination medium into close contact with each other. That is, the present invention can be suitably applied to transfer techniques using magnetic transfer, nanoimprinting, patterned media, etc.

What is claimed is:

1. An apparatus for cleaning a master disk by removing dust attached on the master disk, comprising:
    a disk holding device which holds the master disk;
    a cleaning head on which a self-adhesive member formed so as to have a curved self-adhesive surface facing outward is held;
    a head drive device which moves the cleaning head along a direction perpendicular to a disk surface of the master disk held by the disk holding device and along a disk plane direction parallel to the disk surface; and
    a control device which controls the head drive device to bring a part of a curved portion of the self-adhesive member into contact with the master disk and to reciprocatingly oscillate the self-adhesive member along the disk plane direction of the master disk while maintaining the part of the curved portion in a state of being pressed against the master disk.

2. The apparatus for cleaning a master disk according to claim 1, wherein if a width in a direction of the reciprocating oscillation of an area of landing of the self-adhesive member maintained in contact with the master disk while being in the pressed state is a; and the peak-to-peak amplitude of the reciprocating oscillation is b, $a \geq b$ is satisfied.

3. The apparatus for cleaning a master disk according to claim 2, wherein
    a self-adhesive sheet is used as the self-adhesive member to form a looped shape of the self-adhesive sheet so that a self-adhesive surface of the self-adhesive sheet faces outward, and
    the reciprocating oscillation is performed while pressing a part of the looped shape against the master disk.

4. The apparatus for cleaning a master disk according to claim 3, further comprising a moving-away control device which performs control so that the part of the curved portion in contact with the master disk is separated from the master disk while a peeling angle is formed along the lengthwise direction of the self-adhesive member.

5. The apparatus for cleaning a master disk according to claim 4, further comprising a mechanism which inclines the self-adhesive member along the lengthwise direction of the self-adhesive member with respect to the master disk.

6. The apparatus for cleaning a master disk according to claim 4, wherein the part of the curved portion is formed so that the self-adhesive member is inclined along the lengthwise direction of the self-adhesive member with respect to the master disk when the self-adhesive member and the master disk are disposed by being opposed to each other.

7. The apparatus for cleaning a master disk according to claim 1, wherein
    a self-adhesive sheet is used as the self-adhesive member to form a looped shape of the self-adhesive sheet so that a self-adhesive surface of the self-adhesive sheet faces outward, and
    the reciprocating oscillation is performed while pressing a part of the looped shape against the master disk.

8. The apparatus for cleaning a master disk according to claim 1, further comprising a moving-away control device which performs control so that the part of the curved portion in contact with the master disk is separated from the master disk while a peeling angle is formed along the lengthwise direction of the self-adhesive member.

9. The apparatus for cleaning a master disk according to claim 8, further comprising a mechanism which inclines the self-adhesive member along the lengthwise direction of the self-adhesive member with respect to the master disk.

10. The apparatus for cleaning a master disk according to claim 8, wherein the part of the curved portion is formed so that the self-adhesive member is inclined along the lengthwise direction of the self-adhesive member with respect to the master disk when the self-adhesive member and the master disk are disposed by being opposed to each other.

* * * * *